Patented Nov. 15, 1932

1,887,919

UNITED STATES PATENT OFFICE

WILLI BRÜN, OF KREFELD, GERMANY, ASSIGNOR TO REMINGTON ARMS COMPANY, INC., A CORPORATION OF DELAWARE

PRIMING MIXTURE

No Drawing.   Application filed June 3, 1931. Serial No. 541,946.

This invention relates to priming mixtures for ammunition, and contemplates a priming mixture containing one of the lead salts of 3-5 dinitrobenzoic acid. More specifically, the invention contemplates the use in ammunition priming mixtures of certain new and hitherto unknown salts of this acid which have been discovered by the present inventor.

The 3-5 dinitrobenzoic acid, having the composition $(C_6H_3(NO_2)_2COOH)$, is quite well known, and certain of its salts have been made hitherto, at least as laboratory experiments. The new salts, the discovery of which is comprised in the present invention, are the mono-basic and di-basic lead salts. The mono-basic lead salt has been made as follows:

Into a solution of 3.5 grams of lead nitrate in 100 c. c. of water at a temperature of 70° C. is dropped a mixed solution of 2.12 grams of 3-5 dinitrobenzoic acid and .8 gram of sodium hydroxide in 100 c. c. of water. The lead nitrate solution is constantly stirred while the mixed solution is added, and the stirring is continued thereafter for about 5 minutes at the same temperature. The mixture is then allowed to cool to room temperature, while being stirred, after which the precipitate is filtered off and washed with water. The precipitate is a substantially white and rather fluffy amorphous substance, practically insoluble in cold water and slightly soluble in hot water. Its electro-static properties are very pronounced; a small quantity will cling with great tenacity to a sheet of paper or other nonconductive substance. It contains 47.9% by weight of lead, this analysis conforming quite closely to the theoretical lead content (47.6%) of the mono-basic lead salt of 3-5 dinitrobenzoic acid $(C_6H_3(NO_2)_2COOPbOH)$, which may be written structurally as:

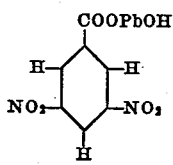

A second and more basic lead salt of 3-5 dinitrobenzoic acid has been made as follows:

Into a solution of 10.5 grams of lead nitrate in 200 c. c. of water is dropped a mixed solution of 4.24 grams of 3-5 dinitrobenzoic acid and 2.4 grams of sodium hydroxide in 200 c. c. of water. The operations of stirring, cooling, filtering and washing, are substantially similar to those described in connection with the preparation of the mono-basic salt. The precipitate in this case is of a cream color, much heavier than the mono-basic salt and without pronounced electro-static properties. It contains 57.8% by weight of lead, which corresponds to the lead content of the di-basic lead salt of 3-5 dinitrobenzoic acid. The theoretical lead content of such di-basic salt is 57.8%, and its formula may be written as $$(C_6H_3(NO_2)_2COO)_2Pb2PbO$$

Both mono-basic and di-basic salts have been found to be extraordinarily useful as fuels for ammunition priming compositions, particularly compositions of the non-corrosive type, certain of which are now available. Mixtures using each of these salts have been prepared and have been found to possess the requisite powder igniting capacity and sensitiveness to blow and, in addition, to present extraordinary resistance to decomposition under severe humidity tests. One example of such a mixture is as follows:

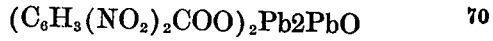

| | |
|---|---|
| Mercury fulminate | 40.8 |
| Barium nitrate | 24.5 |
| Mono-basic lead dinitrobenzoate | 8.2 |
| Glass | 25.5 |
| Gum | 1. |

The lead salt content of the above-mixture may be substantially varied, excellent results having been secured with mixtures containing as low as 6% or as high as 10% thereof, the proportions of the other ingredients being varied accordingly.

Storage for periods up to six weeks in very moist atmosphere at a comparatively high temperature does not appear to have any effect whatever upon the sensitivenes and priming capacity of these mixtures.

The present invention contemplates both the novel basic lead salts of 3-5 dinitrobenzoic acid and the use of such salts as priming mixture ingredients, and the appended claims are to be construed accordingly.

What is claimed is:

1. A priming mixture for ammunition containing a lead salt of 3-5 dinitrobenzoic acid.

2. A priming mixture for ammunition containing a lead salt of 3-5 dinitrobenzoic acid, and a suitable oxidizer therefor.

3. A priming mixture for ammunition containing a lead salt of 3-5 dinitrobenzoic acid, a suitable oxidizer therefor, and a combustion initiator.

4. A non-corrosive priming mixture for ammunition containing a lead salt of 3-5 dinitrobenzoic acid in conjunction with a non-corrosive oxidizing ingredient and a suitable combustion initiator.

5. A priming mixture for ammunition containing approximately

| | |
|---|---|
| Mercury fulminate | 40.8 |
| Barium nitrate | 24.5 |
| Mono-basic 3–5 lead dinitrobenzoate | 8.2 |
| Glass | 25.5 |
| Gum | 1. |

WILLI BRÜN.